United States Patent [19]
Mukai et al.

[11] Patent Number: 6,116,372
[45] Date of Patent: Sep. 12, 2000

[54] ELECTRIC POWER STEERING APPARATUS

[75] Inventors: Yoshinobu Mukai; Yoshiki Noro, both of Saitama-ken, Japan

[73] Assignee: Honda Giken Kogyo Kabushiki Kaisha, Tokyo, Japan

[21] Appl. No.: 09/100,265

[22] Filed: Jun. 19, 1998

[30] Foreign Application Priority Data

Jul. 1, 1997 [JP] Japan .................................. 9-176218

[51] Int. Cl.$^7$ ................................................. B62D 05/04
[52] U.S. Cl. ......................... 180/446; 180/443; 180/444; 180/445; 180/446; 701/41; 701/42
[58] Field of Search .................................. 180/443, 444, 180/445, 446; 701/41, 42

[56] References Cited

U.S. PATENT DOCUMENTS

| | | |
|---|---|---|
| 4,574,903 | 3/1986 | Hashimoto et al. .................... 180/446 |
| 4,702,335 | 10/1987 | Cage et al. .............................. 180/423 |
| 4,954,957 | 9/1990 | Kawagoe et al. ........................ 701/48 |

FOREIGN PATENT DOCUMENTS 59-100059  6/1984  Japan .

*Primary Examiner*—Kevin Hurley
*Attorney, Agent, or Firm*—Merchant & Gould P.C.

[57] ABSTRACT

Steering torque sensor detects steering torque manually applied to the vehicle's steering system. Control unit sets a target motor current corresponding at least to the steering torque detected by the steering torque sensor and has a plurality of steering assist modes to which are allocated different characteristics of a target motor current for an assisting motor. The control unit include a mode switching unit that, in response to a mode setting instruction from a vehicle operator, effects a change between the steering assist modes when the steering torque sensor is in its dead zone and no target motor current signal is being generated. Thus, the driver is allowed to continue driving with a steering characteristic fitting his or her preference, and hence good steering feel and vehicle behavior, even when a steering characteristic change takes place during travel of the vehicle.

1 Claim, 7 Drawing Sheets

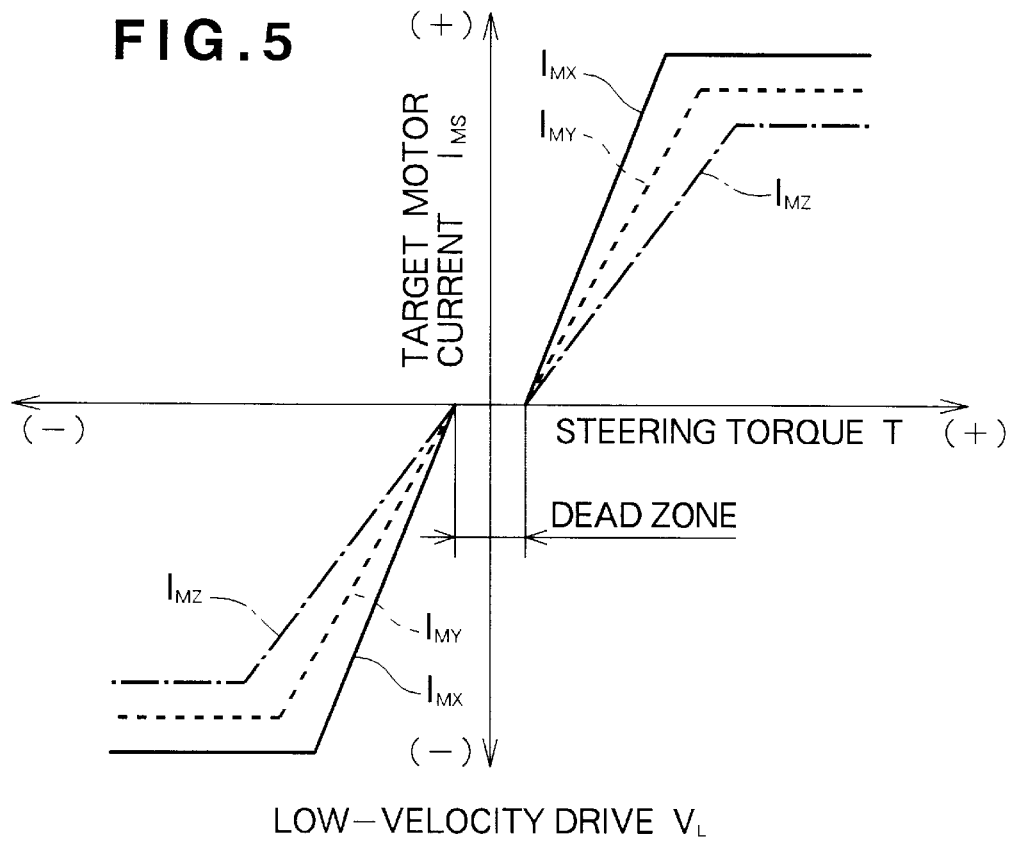
FIG.5 LOW-VELOCITY DRIVE $V_L$
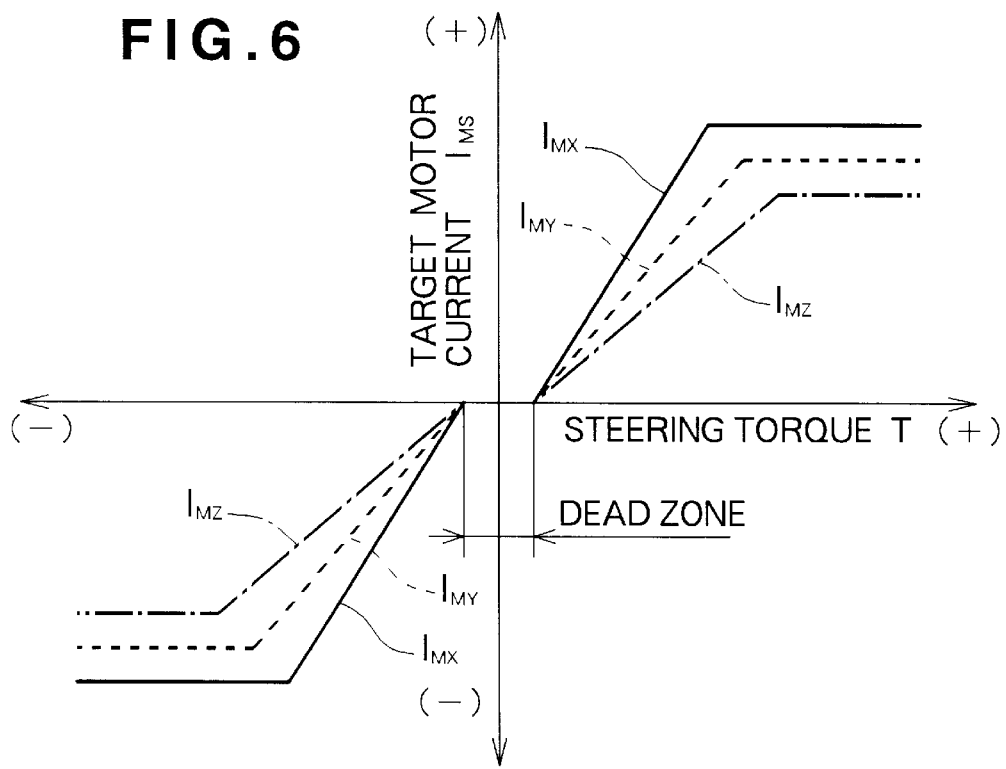
FIG.6 INTERMEDIATE-VELOCITY DRIVE $V_M$

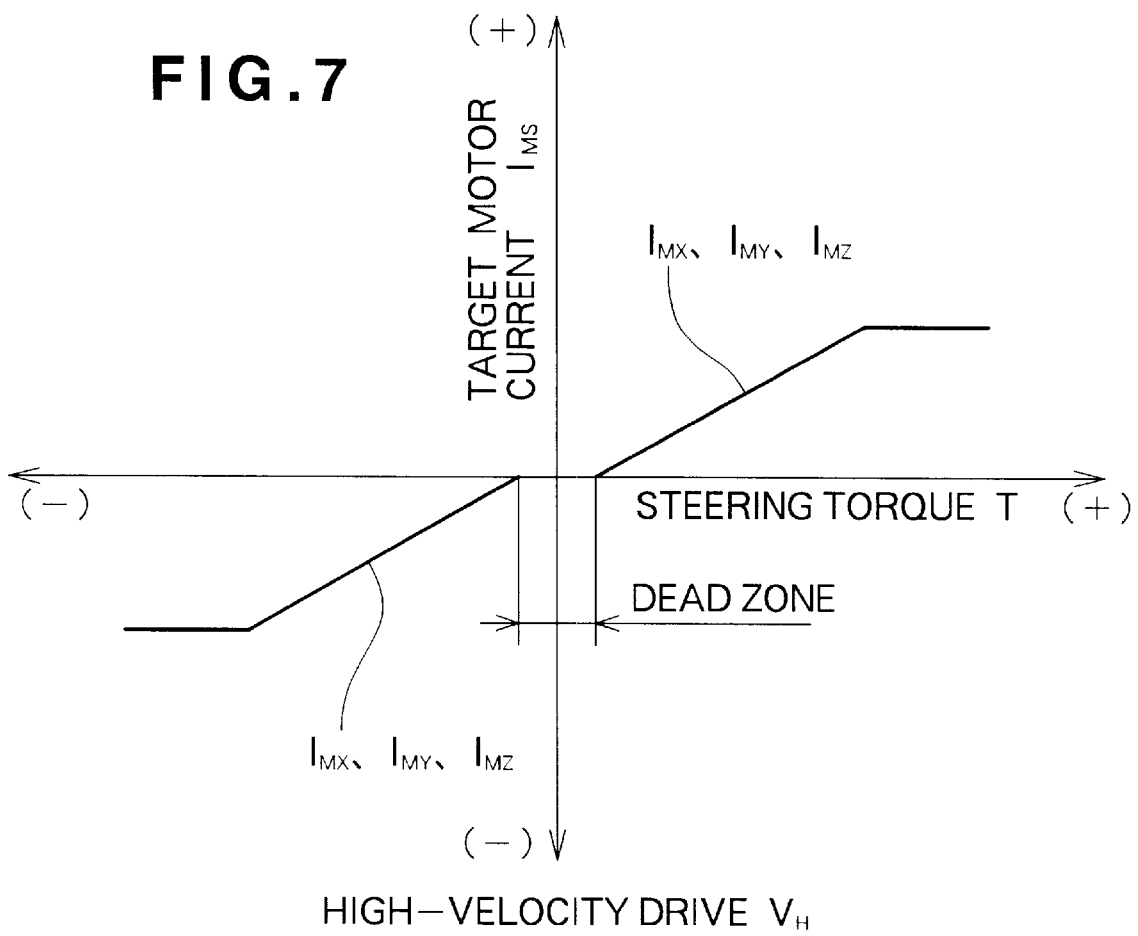

ELECTRIC POWER STEERING APPARATUS

BACKGROUND OF THE INVENTION

1. Field of the Invention

The present invention relates generally to electric power steering apparatuses for automotive vehicles which provide a steering assist of an electric motor directly to the vehicle steering system to reduce steering force to be applied manually by a vehicle driver, and more particularly to an improved electric power steering apparatus which is capable of selectively setting a steering characteristic as desired by the driver.

2. Description of the Related Art

In recent years, there has been an increasing demand that an electric steering assist to vehicle driver's manual steering operation be provided with different characteristics depending on the sex, age, driving experience, etc. of the driver. To address to such a demand, an improved electric power steering apparatus has been proposed in Japanese Patent Laid-open Publication No. SHO-59-100059 which is designed to vary the steering characteristic by switching between normal and sports modes as desired by the vehicle driver. The proposed electric power steering apparatus includes a torque detector for detecting steering torque, a control unit for variably controlling power output from the electric motor in accordance with an output signal from the torque detector, and a servo-rate setting device, positioned within the reach of the driver operating the automotive vehicle, for setting a desired ratio of the output torque from the motor to a level of input signal to the control. With this electric power steering apparatus, a steering characteristic as desired by the driver can be obtained by the driver electing a servo rate to be set by the servo-rate setting device.

Specifically, the servo rate setting device in the proposed electric power steering apparatus is arranged to vary the relation between the level of input signal to the control and the output torque from the motor and thereby vary the steering characteristic, by setting an amplification factor of an amplifier or an attenuation factor of an attenuator connected between it's torque signal input and the output of the torque detector. The servo rate can be set even during running or travel of the automotive vehicle.

However, in the electric power steering apparatus proposed in Japanese Patent Laid-open Publication No. SHO-59-100059, the output torque from the motor would undesirably vary depending on the servo rate even when the steering wheel is operated with same steering torque, although the steering characteristic can be varied as desired by the driver even during travel of the automotive vehicle. Because the steering characteristic varies as the servo rate is changed during steering operation, there could occur a sense of "incongruity" in the driver's steering, which would lead to a deterioration in the driver's steering feel. Particularly, variations in the steering characteristic during a high-speed drive of the automotive vehicle would significantly deteriorate the driver's steering feel and also adversely affect the vehicle behavior.

SUMMARY OF THE INVENTION

It is therefore an object of the present invention to provide an electric power steering apparatus for an automotive vehicle which can maintain good driver's steering feel and vehicle behavior even when the vehicle's steering characteristic is changed during travel of the vehicle.

The present invention provides an electric power steering apparatus for an automotive vehicle which comprises: an electric motor for applying an electric steering assist to a steering system of the automotive vehicle; a steering torque sensor for detecting steering torque manually applied to the steering system; a control unit for setting a target motor current corresponding at least to the steering torque detected by the steering torque sensor, the control unit having a plurality of steering assist modes to which are allocated different characteristics of the target motor current; a drive for driving the electric motor in accordance with a motor control signal generated by the control unit on the basis of the target motor current; and a mode switching unit, provided in the control unit, for, in response to a mode setting instruction from a vehicle operator, effecting a change between the steering assist modes when the steering torque sensor is in its dead zone and no target motor current is being generated. With such an arrangement, the electric power steering apparatus can carry out a change in steering characteristic in the absence of the steering assist from the motor.

BRIEF DESCRIPTION OF THE DRAWINGS

The above and other objects and advantages of the present invention will become apparent from the following detailed description of the preferred embodiments when read in conjunction with the accompanying drawings, in which:

FIG. 5 is a graph showing exemplary control characteristic curves, of a target motor current versus detected steering torque for a low-velocity drive, employee in an assist mode control section of the apparatus;

FIG. 6 is a graph showing exemplary control characteristic curves, of the target motor current versus the detected steering torque for an intermediate-velocity drive, employed in the assist mode control section;

FIG. 7 is a graph showing exemplary control characteristic curves, of the target motor current versus the detected steering torque for a high-velocity drive employed in the assist mode control section.

DETAILED DESCRIPTION OF THE PREFERRED EMBODIMENTS

Figure 1:
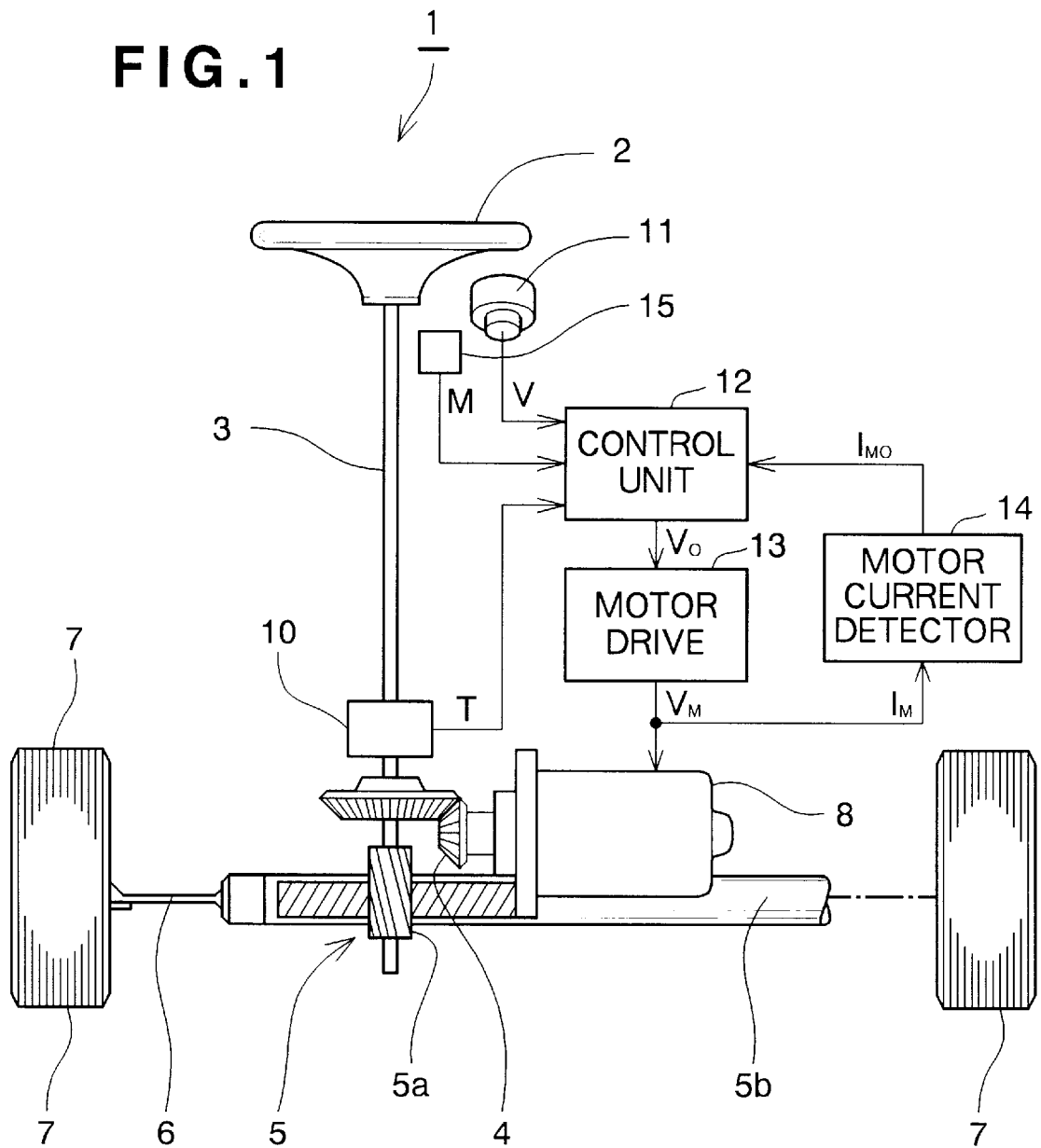
FIG. 1 is a diagram showing the overall setup of an electric power steering apparatus according to a preferred embodiment of the present invention.

FIG. 1 is a block diagram showing the general structure of the electric power steering apparatus according to one embodiment of the present invention. As shown, the electric power steering apparatus 1 comprises a steering wheel 2, a steering shaft 3, a hypoid gear 4, a rack-and-pinion steering gear 5 including a pinion 5a and a rack shaft 5, left and right steerable front wheels 7 connected to the rack shaft 5b via tie rods 6, and an electric motor 8, such as a D.C. motor or brushless motor, for generating an electric steering assist.

Further, the electric power steering apparatus 1 comprises a steering torque sensor 10, a vehicle velocity sensor 11, a control unit 12, a motor drive 13, and a motor current detector 14. The steering torque sensor 10 detects steering torque acting on the steering wheel 2 and outputs a steering torque signal T that is an electric signal corresponding to the detected steering torque. The vehicle velocity sensor 11 detects a velocity of the automotive vehicle and outputs a vehicle velocity signal V that is an electric signal corresponding to the detected vehicle velocity. The control unit 12 sets a target motor current for driving the electric motor 8 on the basis of the steering torque signal T and vehicle velocity signal V and also generates a motor control signal $V_o$ corresponding to the target motor current. The motor drive 13 drives the electric motor 8 with a motor voltage $V_M$ based on the motor control signal $V_o$, using the known PWM (Pulse Width Modulation) control scheme. The motor current detector 14 detects a motor current $I_M$ corresponding to forward or reverse rotation of the electrical motor 8 and converts the motor current $I_M$ into a detected motor current signal $I_{MO}$.

The electric power steering apparatus 1 further includes a mode setting device 15 which is disposed, for example, near the driver's seat and issues a mode setting signal M. Thus, the steering apparatus 1 switches between a plurality of steering assist modes to which are allocated different characteristics (e.g., level values) of the target motor current, in response to the mode setting signal M from the mode setting device 15, as will be later described in detail.

The switchable selection of one of the steering assist modes via the mode setting device 15 may be made depending on a current operating position of a shift lever where the automotive vehicle in question is of the automatic transmission type, or in accordance with an operation condition of the automatic transmission. In another alternative, the switchable selection of one of the steering assist modes may be made automatically depending on a friction coefficient $\mu$ between the road surface and the vehicle tires.

As the vehicle driver or operator manually operates the steering wheel 2, the torque sensor 10 mounted on the steering shaft 3 detects steering torque to feed a steering torque signal T to the control unit 12. The steering torque manually applied by the driver or operator to the steering shaft 3 is converted, via the rack-and-pinion steering gear 5, into an axial linear movement of the rack shaft 5b which changes the steering direction of the front wheels 7 by way of the tie rods 6.

Figure 2:
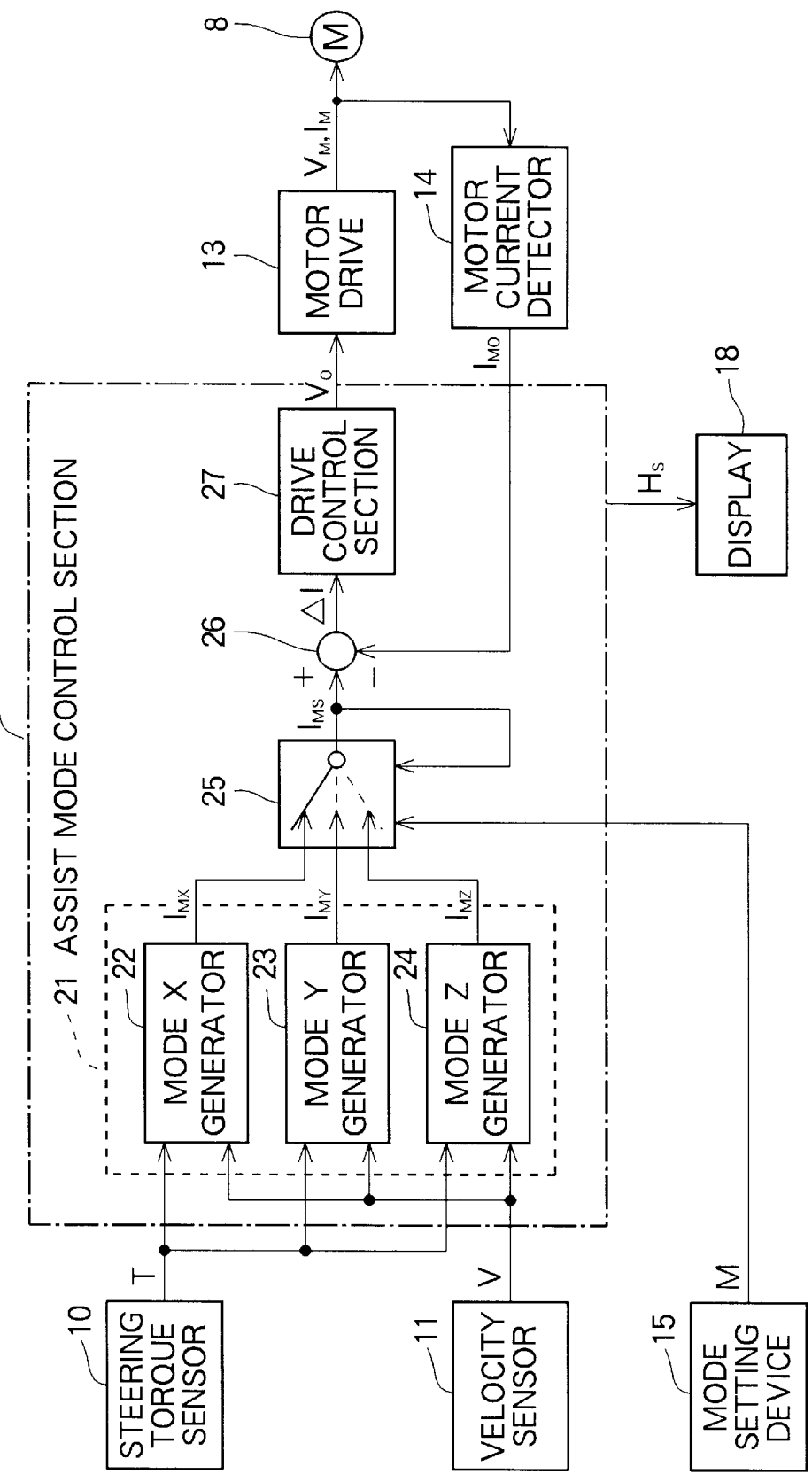
FIG. 2 is a block diagram showing principal parts of the electric power steering apparatus of FIG. 1.

FIG. 2 is a block diagram showing principal parts of the electric power steering apparatus of FIG. 1. The control unit 12, basically comprising a microprocessor, an arithmetic operation section, a processing section and a memory, includes an assist mode control section 21 having a plurality of assist mode generators 22 to 24 to which are allocated different characteristics (e.g., level values) of the target motor current corresponding at least to steering torque signal T. The control unit 12 further includes a mode etching unit 25. In response to a mode setting signal M given from the mode setting device 15, the mode switching unit 25 selects a particular one of the assist mode generators 22 to 24 to which is allocated the target motor current characteristic corresponding to the signal M, when the torque sensor 10 is in its "dead zone" (see FIGS. 5 to 7). Then, the control unit 12 generates a motor control signal $V_o$ corresponding to a target motor current signal from the selected assist mode generator, in accordance with which the motor drive 13 drives the motor 8 with a motor voltage $V_M$. The selected assist mode generator is visually and audibly displayed to the vehicle driver by means of a predetermined display such as denoted at 18.

The above-mentioned motor drive 13 includes a plurality of (e.g., four) switching elements such as power FETs (Field Effect Transistors) and generates a motor voltage $V_M$ corresponding to the motor control signal $V_o$ (PWM signal) so that the motor 8 is driven by a bidirectional motor current $I_M$ corresponding to the absolute value an direction of the steering torque signal T.

Torque generated by the electric motor 8 is increased twofold via the hypoid gear 4 and applied to the steering shaft 3 as an electric steering assist. The motor current detector 14 converts the motor current $I_M$, to be actually passed to the motor 8, into voltage by means of resistance and/or Hall effect device, and the converted voltage is then again converted into a digital detected motor current signal $I_{MO}$. The digital detected motor current signal I is sent to the control unit 12 for negative feedback to the target motor current.

More specifically, the assist mode control section 21, which is based on a memory such as a ROM, has a plurality of the assist mode generators, i.e., assist mode X generator 22, assist mode Y generator 23 and assist mode Z generator 24. The control unit 12 also includes an offset calculating section 26 and a drive control section 27. Thus, on the basis of the steering torque signal T and vehicle velocity signal V from the torque and velocity sensors 10 and 11, the assist mode generators 22 to 24 output target motor current signals $I_{MX}$, $I_{MY}$, $I_{MZ}$ (representing different characteristics of the target motor current) to the mode switching unit 25.

More specifically, in the assist mode X generator 22, various level values of target motor current signal $I_{MX}$ corresponding to various possible values of steering torque signal T are empirically obtained and stored in association with values of vehicle velocity signal as parameters, so that the generator 22 supplies the mode switching unit 25 with one of the values of target motor current signal $I_{MX}$ corresponding to the steering torque signal T and vehicle velocity signal V currently detected by the torque and velocity sensors 10 and 11. Similarly, in each of the assist mode Y generator 23 and assist mode Z generator 24, various values of target motor current signal $I_{MY}$ or $I_{MZ}$ and corresponding to various possible values of steering torque signal are empirically obtained and stored in association with values of vehicle velocity signal V as parameters, so that the generator 23 or 24 supplies the mode switching unit 25 with one of the values of target motor current signal $I_{MY}$ or $I_{MZ}$ corresponding to the steering torque signal T and vehicle velocity signal V currently detected by the torque and velocity sensors 10 and 11.

Thus, the assist mode X generator 22 provides a target motor current characteristic (level value) suitable for a situation where a great electric steering assist relative to the steering torque signal T is required, namely, suitable for beginner's-class, female or aged drivers who need a greater electric steering assist in response to manual operation of the steering wheel with small force. The assist mode Y generator 23 provides a target motor current characteristic, corresponding to those obtained by the conventional normal-mode steering operation, which will afford a smaller electric steering assist than that given by the assist mode X generator 22 in response to the same manual steering force. Further, the assist mode Z generator 24 provides a target motor current signal characteristic, corresponding to those obtained by the conventional sports-mode steering operation, which will afford a yet smaller electric steering assist than that given by the assist mode Y generator 23.

Figure 3:
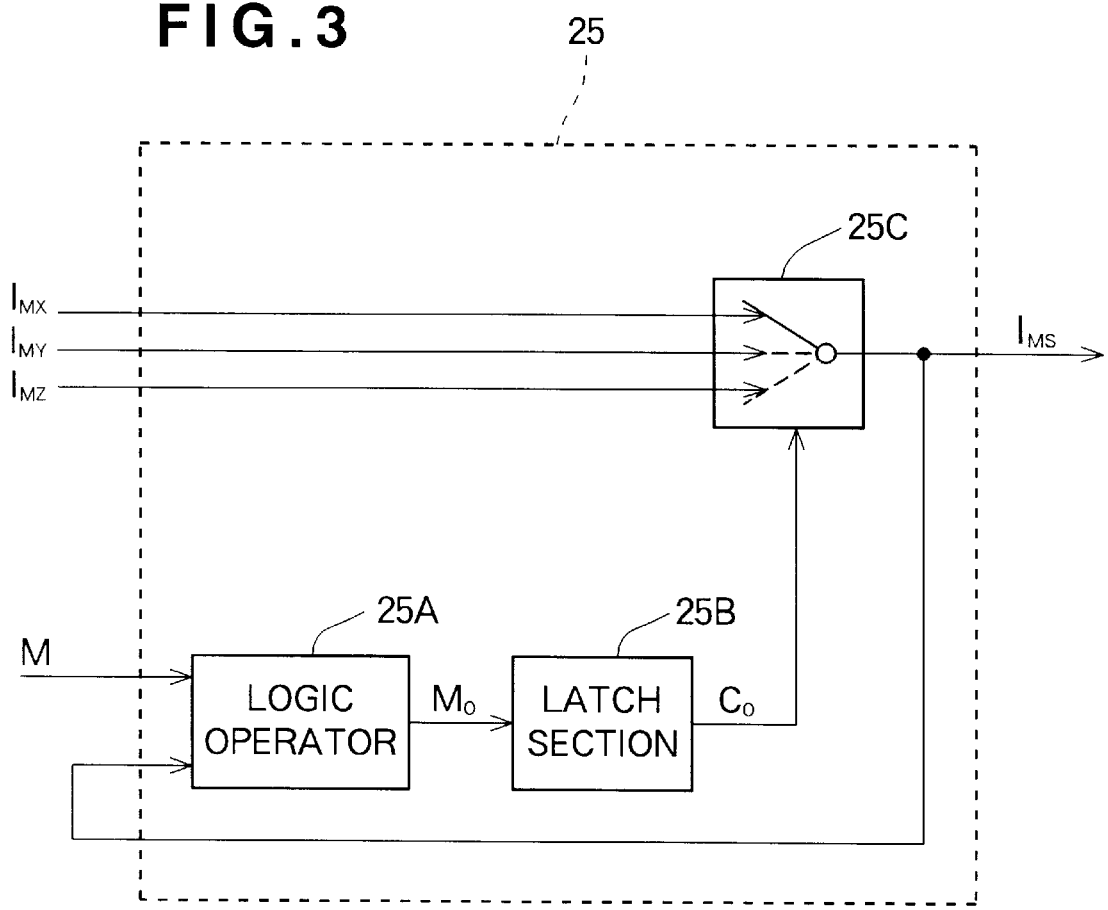
FIG. 3 is a block diagram showing principal parts of a mode switching unit shown in FIG. 2.

FIG. 3 is a block diagram showing principal parts of the mode switching unit 25 shown in FIG. 2. As shown, the mode switching unit 25 includes a logic operator 25A, a latch section 25B and a switch section 25C. With these elements, one of the steering assist modes select by the vehicle driver via the mode setting device 15 is set in the control unit 12, when the steering torque sensor 10 is outputting a "dead zone" steering torque signal T, i.e., when the target motor current signals $I_{MX}$, $I_{MY}$ and $I_{MZ}$ supplied from from the mode X generator, mode Y generator and mode Z generator is of zero value (namely, the output $I_{MS}$ of the mode switching unit 25 is zero). In other conditions than the above-mentioned, such as when no mode setting signal M based on a vehicle operator's instruction is being output from the mode setting device 15 or when the output $I_{MS}$ of the mode switching unit 25 is not zero ($I_{MS} \neq 0$), an assist mode change is inhibited.

The logic operator 25A has comparison, exclusive OR and AND functions. The comparison function determines the target motor current signal $I_{MS}$ of zero value as low or L level and the target motor current signal $I_{MS}$ of non-zero value as high or H level. By the exclusive OR function an exclusive OR is obtained between the target motor current signal $I_{MS}$ of zero value (L level) from the the switch section 25C (corresponding to the dead zone of the steering torque sensor) and a predetermined input preset to the H level. Then, by the AND function, an AND is obtained between the H level output from the exclusive OR function and the mode setting signal M, so that the mode setting signal M is allowed to pass, through the logic operator 25A, to the latch section 25B as a logic signal $M_o$.

When the target motor current signal $I_{MS}$ is of H level, the exclusive OR function always provides a L level output, and the AND between the L-level exclusive OR output from the exclusive OR function and the mode setting signal M always assumes a L level, so that the logic operator 25A outputs a low-level logic signal $M_o$ and hence inhibits passage of the mode setting signal M.

The mode setting signal M may be a pulse signal representative of a binary code or unique pulse width corresponding to a selected steering assist mode. When the mode setting signal M is input with the L-level target motor current signal $I_{MS}$, the logic signal $M_o$ becomes a pulse signal representative of the same binary code or unique pulse as the mode setting signal M.

The latch section 25B includes a rewritable memory, such as a RAM and a decoder. Thus, the latch section 25B holds each newest logic signal $M_o$ in the memory and converts the logic signal $M_o$ into a switch control signal $C_o$ to be then fed to the switch section 25C. The switch section 25C includes an electronic switch, which, in response to the switch control signal $C_o$ from the latch section 25C, selects one of the target motor current signals $I_{MX}$, $I_{MY}$, $I_{MZ}$ from the mode generators 22 to 24 to provide the selected signal as the target motor current $I_{MS}$.

With the above-mentioned arrangement, the mode switching unit 25 in the present embodiment can change the steering characteristic as desired by the vehicle driver, when one of the steering assist modes is selected by the driver via the mode setting device 15 while the steering torque sensor 10 is in the dead zone (i.e., target motor current $I_{MS}$ is zero).

Figure 4:
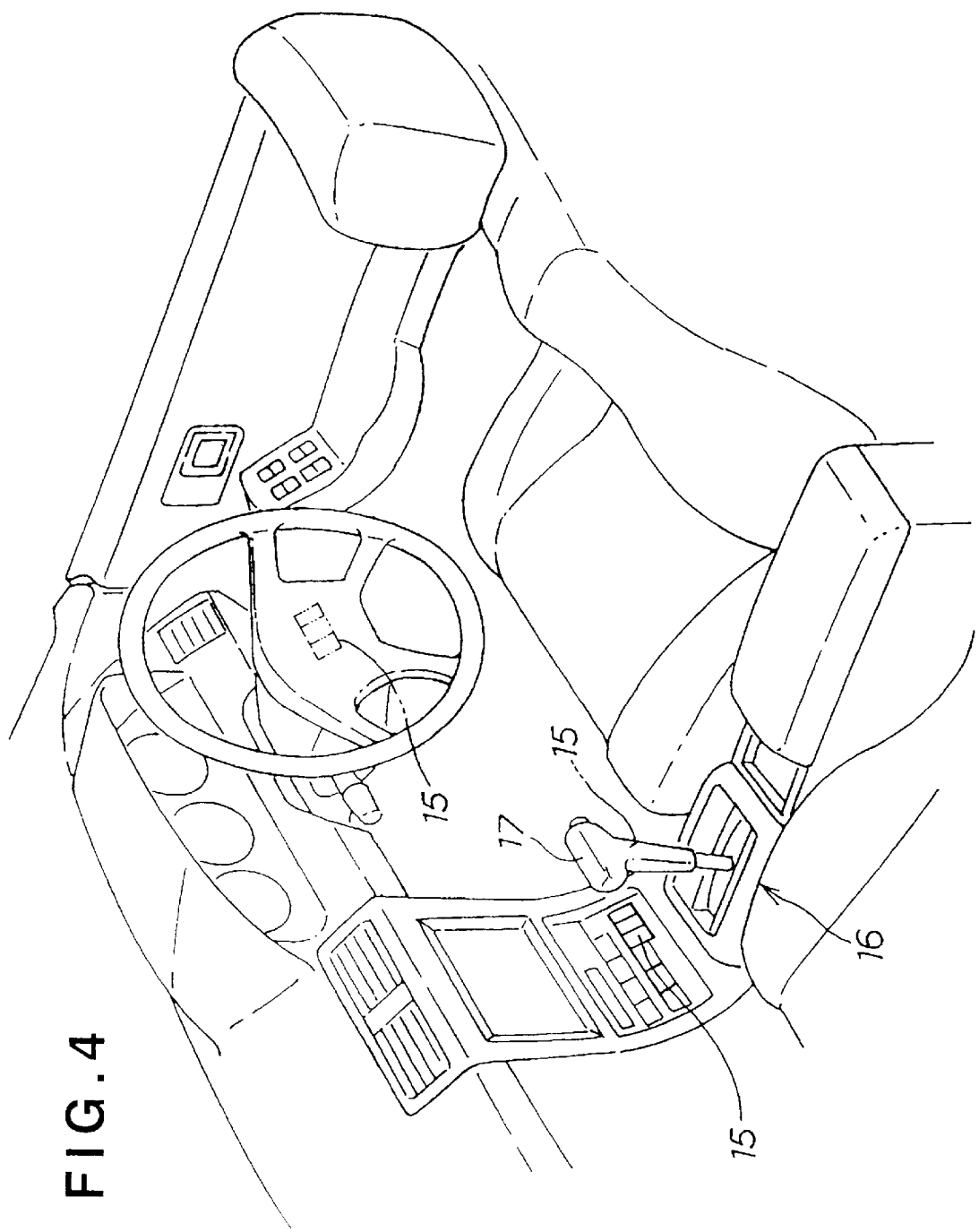
FIG. 4 is a perspective view showing exemplary positions where a mode setting device of FIG. 1 is mounted inside an automotive vehicle near the driver's seat

FIG. 4 is a perspective view showing an exemplary manner in which the mode setting device 15 is provided inside the automotive vehicle near the driver's seat. In the figure, the setting device 15 is shown as comprising a plurality of push-button switches or keys provided in corresponding relations to the assist mode generators 22 to 24 of the assist mode control section 21 shown in FIG. 2; these keys may be positioned on the surface of an operation pan 1 or steering wheel or a shift lever of an automatic transmission 16 if the automotive vehicle is of the automatic-transmission type.

FIG. 5 is a graph showing exemplary control characteristic curves, of the target motor current $I_{MS}$ versus the steering torque T for a low-velocity drive $V_L$ employed in the assist mode control section 21. In a region where the steering torque signal T is in a small-value range at and around "0", there exists the "dead zone" where the target motor current $I_{MS}$ maintains a value "0" irrespective of an increase in the value of the steering torque signal T. As the steering torque signal T increases in value beyond the dead zone, the value of the target motor current $I_{MS}$ increases linearly and then reaches a saturated zone where it remains instant irrespective of the increasing value of the steering torque signal T.

As shown in FIG. 5, in the low-velocity driving condition $V_L$, the assist mode generators 22, 23 and 24 of FIG. 2 generate a target motor current signal $I_{MX}$ (solid line), target motor current signal $I_{MY}$ (broken line) and target motor current signal $I_{MZ}$ (dot-dash line), respectively, in response to the steering torque signal T.

The vehicle driver can freely select desired one of the assist mode generators 22, 23 and 24 and hence set a target motor current signal $I_{MX}$, $I_{MY}$ or $I_{MZ}$ suitable for his or her actual manual steering force, by just operating the mode setting device 15, when the steering torque sensor 10 is in the dead zone (target motor current $I_{MS}$). Because an assist mode change or steering assist characteristic change is effected in the dead zone where no steering assist is being generated, the present embodiment can reliably avoid adverse effects on the driver's steering feel and vehicle behavior even when the assist mode change takes place during travel of the vehicle.

FIG. 6 is a graph showing exemplary control characteristic curves, of the target motor current $I_{MS}$ versus the steering torque T for an intermediate-velocity drive $V_M$, employed in the assist mode control section 21. In the intermediate-velocity driving condition $V_M$, target motor current signals $I_{MX}$, $I_{MY}$ and $I_{MZ}$ present trends similar to those presented in the low-velocity driving condition $V_L$ of FIG. 5, but these signals $I_{MX}$, $I_{MY}$ and $I_{MZ}$ increase in value at a slower rate than the counterparts of FIG. 5 and reach saturated values smaller than those of FIG. 5.

By thus setting the target motor current signals $I_{MX}$, $I_{MY}$, and $I_{MZ}$ for the intermediate-velocity drive $V_M$ to be smaller in value than the counterparts for the low-velocity drive $V_L$, the electric steering assist from the motor 8 is controlled to become smaller as the vehicle velocity increases; that is, manual steering force to be applied by the driver gets greater (i.e., the driver's steering effort becomes heavier) as the automotive vehicle speeds up.

FIG. 7 is a graph showing exemplary control characteristic curves, of the target motor current $I_{MS}$ versus the steering torque T for a high-velocity drive $V_H$, employed in the assist mode control section. As shown, in the high-velocity driving condition $V_M$, the assist mode generators 22, 23 and 24 are set to generate respective target motor current signals $I_{MX}$, $I_{MY}$ and $I_{MZ}$ that are substantially identical to each other in value.

Referring back to FIG. 2, the offset calculating section 26 has a subtracter or software-controlled subtraction function, which calculates a difference or offset between the target motor current $I_{MS}$ ($I_{MX}$, $I_{MY}$ or $I_{MZ}$) sent via the mode switching unit 25 and the digital detect motor current signal $I_{MO}$ corresponding to the motor currant $I_M$ detected by the motor current detector 14 and feeds the thus-calculated offset ΔI (=$I_{MS}-I_{MO}$) to the drive control section 27.

The drive control section 27 includes a PID controller that applies PID (Proportional and Integral and Derivative) compensation operations to the offset signal ΔI (=$I_{MS}-I_{MO}$), and a signal generator that generates a motor control signal $V_o$ that is a composite or combination of a PWM (Pulse-Width-Modulated) signal and ON signal to control the direction and intensity of torque generated by the motor 8 on the basis of an output signal from the PID controller.

The motor drive 13 includes a bridge circuit comprised of a plurality of (e.g., four) switching elements such as power FET's (Field-Effect Transistors) and is controlled by the motor control signal $V_o$ containing the PWM (Pulse-Width-Modulated) signal and ON signal, so as to feed motor voltage $V_M$ of a given direction and intensity to the motor 8. Thus, the motor 8 is driven, by the motor voltage $V_M$ fed from the motor drive 13, to generate power or torque corresponding to the motor current $I_M$, and the thus-generated torque is applied to the vehicle steering system as an electric steering assistance.

Further, the motor current detector 14, which may comprise a Hall effect device or resistor detecting current as voltage, detects the motor current $I_M$ passing through the motor 8 and feeding digital detected motor current $I_{MO}$ back to the negative (−) input of the offset calculating section 26. The motor current detector 14 constitutes a negative feedback loop together with the offset calculating section 26, drive control section 27 and motor drive 13, and control is performed such that the offset signal ΔI (=$I_{MS}-I_{MO}$) promptly becomes zero (I=I ) so that the motor current $I_M$ promptly equals the target motor current $I_{MS}$. The display 18, which may comprise a visual display such as a liquid crystal display or an audio display such as sound synthesizer, visually or aurally informs the vehicle driver of various states of the currently-selected steering assist mode.

Figure 8:
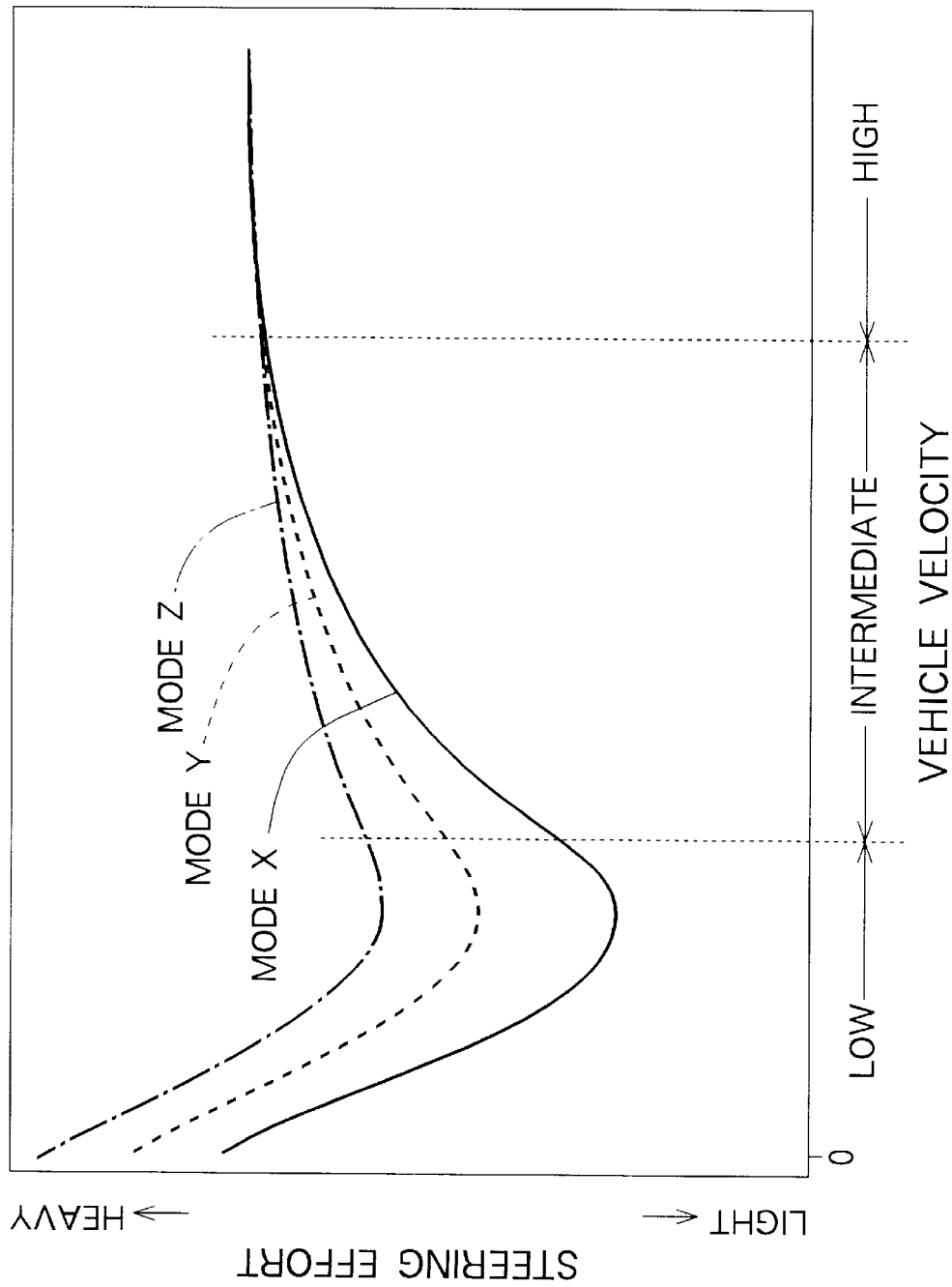
FIG. 8 is a graph showing relationships between the vehicle velocity and necessary manual steering effort in three steering assist modes of the electric power steering apparatus.

Finally, FIG. 8 is a graph showing relationships between vehicle velocity and manual steering effort in the three steering assist modes of the electric power steering apparatus according to the present invention. As shown, a manual steering force that needs to be applied by the driver (necessary steering effort) to largely turn the steering wheel during stoppage of the automotive vehicle, i.e., when the vehicle velocity is "0", (hereinafter called "during-stoppage steering effort") is relatively great or heavy in all of the assist modes X, Y and Z; more specifically, the "during-stoppage steering effort" in the assist mode X is set to be lighter than the "during-stoppage steering effort" in the mode Y which is in turn set to be lighter than that in the mode Z.

As the vehicle velocity increases for a low-velocity drive, counteractive force from the road surface decreases and the electric steering assist is governed by the control characteristic of FIG. 5, so that the necessary steering effort in the assist mode X (corresponding to target motor current signal $I_{MX}$) becomes additionally smaller than the necessary steering effort in the mode Y (corresponding to target motor current signal $I_{MY}$) which in turn becomes additionally smaller than that in the mode Z (corresponding to target motor current signal $I_{MZ}$).

Then, in an intermediate-velocity drive, the electric steering assist is governed by the control characteristic of FIG. 6, so that the differences between the necessary steering efforts in the three steering assist modes gradually increase due to an automatically-occurring great braking action responsive to the increasing vehicle velocity, although the magnitudes of the necessary steering efforts remain in the above-mentioned order. Further, in a high-velocity drive, the electric steering assist is governed by the control characteristic of FIG. 7, so that the necessary steering efforts in the three steering assist modes become substantially uniform due to the automatic braking action responsive to the increasing vehicle velocity.

FIG. 8 apparently shows that in the velocity and intermediate-velocity driving conditions, the vehicle driver is allowed to selectively set one of the steering assist modes in accordance with his or her inclination or preference and thereby achieve an optimum steering characteristic, because the necessary steering effort is differentiated by selecting one of the assist modes X, Y and Z. Further, in the high-velocity driving condition, the steering effort does not substantially differ among the assist modes, so that an uniform steering characteristic is achieved in each of the steering assist modes, which would not change the driver's steering feel and vehicle behavior no matter which of the assist modes is selected.

Furthermore, in each of the low-velocity, intermediate-velocity and high-velocity driving conditions, the above-described power steering apparatus can set a steering characteristic (steering assist mode) while no steering assist is given. Thus, once one of the X, Y and Z modes is set, the driver is allowed to continue driving with a steering characteristic fitting his or her preference, and hence with a good steering feel and vehicle behavior, until the driver again effects a change to another steering assist mode.

In summary, the electric power steering apparatus of the present invention is characterized in that in response to the mode setting instruction signal from the vehicle operator, the mode switching unit effects a change between the steering assist modes when the steering torque sensor is in its dead zone and no target motor current signal is being generated. With such an arrangement, the electric power steering apparatus can carry out a change in steering characteristic in the absence of the steering assist from the motor. As a result, the driver is allowed to continue driving with a steering characteristic fitting his or her preference, and hence good steering feel and vehicle behavior, even when a steering characteristic change takes place during travel of the vehicle.

What is claimed is:

1. An electric power steering apparatus for an automotive vehicle having a steering system, the electric power steering apparatus comprising:

an electric motor for applying an electric steering assist to the steering system of the automotive vehicle;

a steering torque sensor for detecting steering torque manually applied to the steering system;

a control unit in communication with the steering torque sensor, wherein the control unit sets a target motor current corresponding at least to the steering torque detected by said steering torque sensor, said control unit having a plurality of steering assist modes to which are allocated different characteristics of the target motor current; and a drive in communication with the control unit and the electric motor for driving said electric motor in accordance with a motor control signal generated by said control unit on the basis of the target motor current;

the control unit including a mode switching unit wherein the mode switching unit, in response to a mode setting instruction from a vehicle operator, effects a change between the steering assist modes when said steering torque sensor is in its dead zone.

* * * * *